United States Patent [19]

Breiner

[11] Patent Number: 4,587,467
[45] Date of Patent: May 6, 1986

[54] SYSTEM FOR ORIENTING A ROTATING MEMBER

[75] Inventor: Bruce A. Breiner, Lititz, Pa.
[73] Assignee: RCA Corporation, Princeton, N.J.
[21] Appl. No.: 711,724
[22] Filed: Mar. 14, 1985
[51] Int. Cl.$^4$ .............................................. H02P 3/08
[52] U.S. Cl. ..................................... 318/272; 318/275; 318/313
[58] Field of Search .............. 318/268, 269, 272, 273, 318/274, 275, 277, 313, 445, 450, 480

[56] References Cited

U.S. PATENT DOCUMENTS

| 3,163,811 | 12/1964 | Vaucher | 318/275 |
| 3,216,351 | 11/1965 | Ritzerfeld et al. | 318/275 X |
| 3,653,112 | 4/1972 | Smith et al. | 445/68 |
| 3,672,014 | 6/1972 | Kimbrough | 445/30 |
| 4,184,687 | 1/1980 | Wren et al. | 318/313 X |
| 4,370,036 | 1/1983 | Kelly et al. | 354/1 |

FOREIGN PATENT DOCUMENTS 52-27987  3/1977  Japan ................................... 318/313

Primary Examiner—William M. Shoop, Jr.
Assistant Examiner—Bentsu Ro
Attorney, Agent, or Firm—E. M. Whitacre; D. H. Irlbeck; L. L. Hallacher

[57] ABSTRACT

A system for orienting a rotating member includes a slow down and a stop sensor. A logic circuit receives inputs from the sensors to slow and stop the rotating member. A slow down signal must be received before a stop signal can effect the rotations. Starting is delayed to enable the motor starting circuit to go through the necessary start up sequences.

10 Claims, 4 Drawing Figures

SYSTEM FOR ORIENTING A ROTATING MEMBER

BACKGROUND

This invention relates generally to motor control and particularly to a system for accurately orienting a member being rotated by a motor.

The screen of a color picture tube is composed of triads of phosphors which emit different colored light when excited by electrons. Typically, the screen is composed of alternating stripes or circular dots of phosphors which respectively emit red, green and blue light. Positioned between the screen and the electron gun from which the exciting electrons emanate, is an apertured color selection electrode, commonly called a shadow mask. The shadow mask assures that the electron beams excite stripes or dots of the proper color.

During the production of the phosphor screen, a faceplate panel is placed in a rotating carrier. A slurry containing the phosphor is fed onto the panel and the rotation causes the slurry to uniformly coat the entire interior surface of the panel. During the rotation, the panel moves along a conveyor system while the slurry spreads across the surface of the panel, and excess slurry is poured from the panel. The shadow mask is inserted into the panel and the panel is placed upon a lighthouse where the phosphor is exposed to light through the apertures within the shadow mask.

The trend in the production of color picture tubes is that of automating the equipment used to produce and handle the various parts from which the color picture tubes are made. Automatic production systems typically include a programmable computer to control the transfer and production equipment and also to keep track of the sizes and types of parts being processed. An example of an automated system, for producing color picture tube screens is described in U.S. Pat. No. 4,370,036 issued to W. R. Kelly on Jan. 25, 1983. Typically in automatic systems, parts being transferred from one position to another, or being processed, must be arranged at a specific position and in a particular orientation. For this reason, there is a need for a system for accurately stopping the rotating carriers so that the panels carried by the carriers are in a predetermined orientation whereby the panels can be removed from the carriers by automatic equipment. The present invention fullfills this requirement.

SUMMARY

In a system for accurately orienting a member, rotated by a motor, in a desired orientation, the motor is responsive to a motor speed control means whereby the motor is controlled by the system through the motor speed control means. A slow down sensor and a stop sensor are actuated when a means arranged on the rotated member passes in close proximity to the sensors whereby the sensors sequentially provide slow down and stop signals. Logic control means is responsive to the slow down and stop signals. The logic control means actuates the motor speed control in response to the slow down and stop signals whereby the motor is responsive to said slow down and said stop sensors. Motor start control means delays rotation of the motor for a predetermined time after the system is activated.

DETAILED DESCRIPTION

Figure 1:
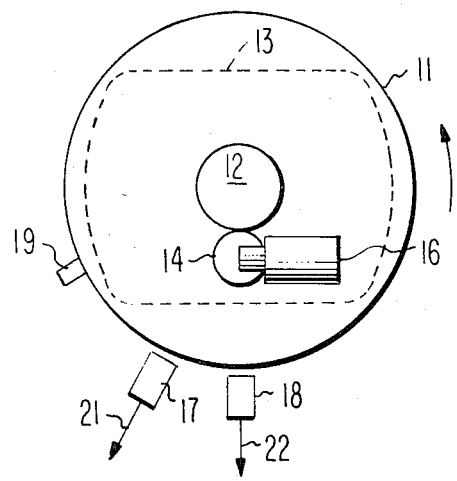
FIG. 1 is a simplified top view of a panel carrier and associated slow down and stop sensors.

In FIG. 1, a rotatable member, or panel carrier, 11 is arranged for counterclockwise rotation about a center hub 12. The carrier 11 supports a faceplate panel 13, shown in phantom. Typically, the carrier 11 is rotated as the carrier moves along a processing line while the slurry is applied and spread onto the inside surface of the panels. Accordingly, the carriers are rotated by a drive mechanism which is a part of the processing line. After the application of the slurry is complete, the rotation is stopped and the panel is removed from the carrier 11. The panel is then placed onto a lighthouse where the phosphor lines are produced by photographic exposure to light. When automatic transfer of the panel is used, the panel must be in a specific orientation. Accordingly, the hub 12 is brought into contact with a friction wheel 14 which is driven by a motor 16. The motor 16 preferrably is a DC permanent magnet motor having a regenerative feedback control. Accordingly, the motor 16 can run at either a high or a low speed and can be stopped very quickly in response to a stop signal. The motor speed control is a commercially available item which can be purchased with the motor, for example, a Model 2251 Fincor, Regenerative Motor Controller can be used.

A slow down sensor 17 and a stop sensor 18 are arranged in the proximity of the carrier 11. The sensors 17 and 18 are spaced at a desired angular spacing so that the time lapse between a point on the carrier 11 passing between the two sensors is known for a particular rotational speed of the carrier. Thus, because of the dynamic breaking of the motor 16, the carrier 11 can be accurately stopped upon the reception of a stop signal from the sensor 18. A sensor actuating means 19, is permanently affixed to the carrier 11 and is arranged to pass in the close proximity of the sensors 17 and 18. The sensors 17 and 18 can be electrical coils and the means 19 a permanent magnet whereby the sensors 17 and 18 produce electrical output pulses on the output lines 21 and 22, respectively in response to the passage of the actuating means 19 past the sensors. Alternatively, the sensors 17 and 18 can be light sources having detectors which are responsive to light reflected from the edge of the carrier 11. In this instance, the actuating means 19 is a low reflectivity element which substantially reduces the reflection of light to the sensors from the edges of the carrier 11, whereby the stop and slow down are provided in response to the reduction in reflectivity.

Figure 2:
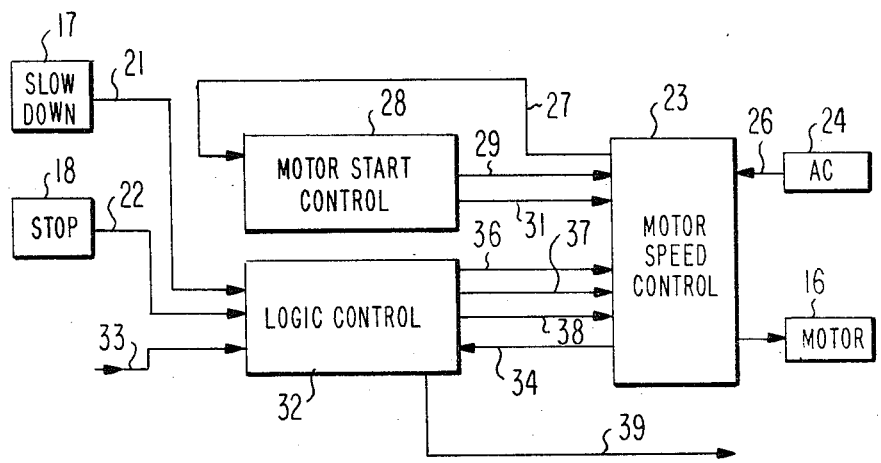
FIG. 2 is a block diagram of a preferred embodiment.

In FIG. 2, the motor 16 is controlled by a motor speed control circuit 23. The speed control 23 receives energizing power from an AC source 24 over a line 26. The motor speed control 23 provides AC voltage on an output line 27, which serves as an input to a motor start control 28. Two output lines 29 and 31 of the motor start control 28 serve as input lines to the motor speed control 23.

The signals from the slow down sensor 17 and stop sensor 18 available on lines 21 and 22, respectively, serve as input signals to a logic control 32. The logic control 32 also receives an enable signal on an input line 33. The enable signal on line 33 is provided by an automatic handling system in which the invention is incorporated. Thus, when faceplate panels are transferred by a computer controlled mechanism, such as a Unimate, the enable signal on line 33 is provided when the carrier 11 engages the motor 16. The logic control 32 receives an input from the motor speed control 23 on a line 34. Additionally, three output lines 36, 37 and 38 are provided from the logic control 32 to the motor speed control 23. An orientation complete signal is provided on an output line 39 of the logic control 32 after the carrier 11 and panel 13 are in the desired orientation. The details and operation of the motor start control 28 and the logic control 32 are described more fully hereinafter with respect to FIGS. 3 and 4, respectively.

Briefly stated, in operation the motor 16 constantly runs at high speed. When the carrier 11 comes into contact with the friction wheel 14 the carrier promptly rotates at high speed prior to being properly oriented. An enable signal is applied on line 33 to the logic control 32 by the central computer which control the entire automatic system.

The logic control 32 and the motor speed control circuit 23 communicate to slowdown and stop the motor 16. When the actuating means 19, which is affixed to the carrier 11, comes into the proximity of the slow down sensor 17, a slow down signal is applied to the logic control 32 over the input line 21. The logic control 32 applies a signal to the motor speed control 23 to change the speed of the motor 16 from high speed to a low speed. When the means 19 comes into the proximity of the stop sensor 18 a stop signal is provided by input line 22 of logic control 32 to cause the motor speed control 23 to stop the rotation of the motor 16. Because of the regenerative feedback breaking of the motor 16, the motor promptly stops with the panel 13 accurately orientated. Simultaneously with the generation of the stop signal, the logic control 32 also provides an orientation complete signal on the output line 39. This signal is used to inform the automatic processing system employing the invention that the panel 13 is properly oriented and the automatic transfer equipment can be used to lift the panel 13 from the carrier 11. After the panel is removed from the carrier 11, the motor 16 is reset to run at high speed. By removing the enable signal upon initial start-up of the orienting system, the motor speed control 23 energizes the motor start control 28 over the line 27. The motor start control 28 prevents the motor 16 from rotating for a brief, predetermined period of time to allow the motor speed control to properly phase through the necessary start steps. At the expiration of the predetermined time period, the motor speed control 23 energizes the motor 16 to run at high speed and the system is ready to receive a carrier. The motor start control 24 is only energized when AC power is removed from the motor speed control 23,.

Figure 3:
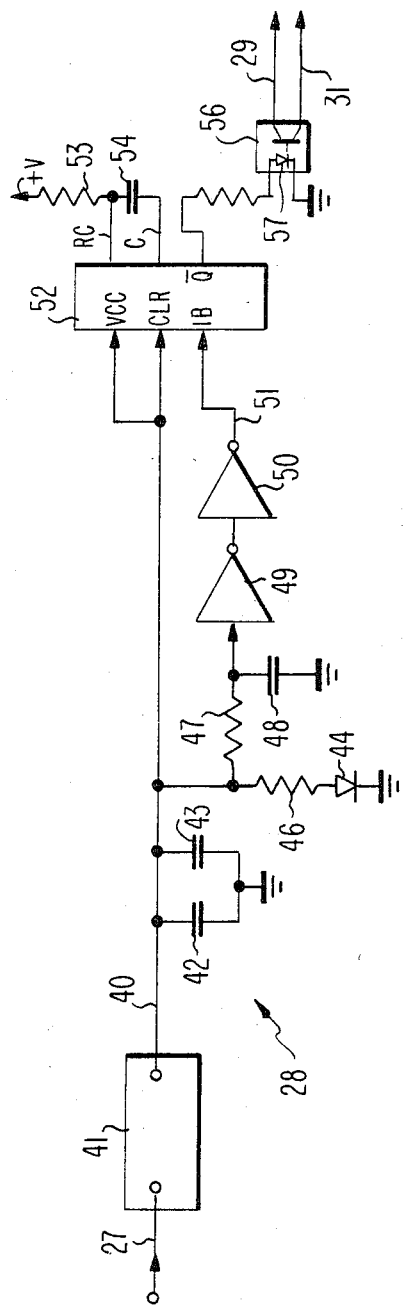
FIG. 3 is a logic diagram of the motor start control of FIG. 2.

In FIG. 3, the motor start control 28 includes a rectifier 41 which also can include a power supply. The rectifier 41 receives the AC voltage on the input line 27 and provides a positive DC voltage, such as 15 volts, on an output line 40. Two capacitors 42 and 43 are coupled between the output line 40 and ground to form a decoupling network. A LED (light emitting diode) 44 and a resistor 46 are connected between the line 40 and ground. Accordingly, when the line 40 is high the LED 44 is illuminated to indicate that DC power is on and the motor start circuit 28 is energized. The positive voltage on the line 40 is applied to the input of an inverter 49 by an RC timing network composed of a resistor 47 and a capacitor 48. Another inverter 50 recieves the output of the inverter 49. The output of the inverter 50 on a line 51 is applied as an input to the 1B input terminal of a monostable logic circuit 52, such as a one shot. The VCC and clear inputs of the one shot 52 are rendered high by the DC voltage on the output line 40. A positive voltage is applied to the one-shot 52 through an RC timing network composed of resistor 53 and capacitor 54 which are, respectively, coupled to the RC and C inputs of the one shot 52. The $\overline{Q}$ output of the one shot 52 is applied to the LED 57 of an opto-isolator 56.

Initially, the output of the rectifier 41 is off and the line 40 is low. Under these conditions the $\overline{Q}$ output of the one shot 52 is low and no voltage is applied across the LED 57 of the opto-isolator 56 so that no current can flow. When voltage is applied to the rectifier 41, the line 40 goes high and the VCC and clear inputs of the one shot 52 also go high. The DC power is also applied to the input of inverter 49 by the RC timing network including the resistor 47 and the capacitor 48. Accordingly a positive-going signal is applied to the input of the inverter 49. The inverters 49 and 50 are used to shape the signal. The output of the inverter 50 on the line 51 thus is a positive going signal which is applied to the 1B input of the one shot 52. When the one shot 52 times out, in accordance with the time constant of the RC network including resistor 53 and capacitor 54, the $\overline{Q}$ output of one shot 52 goes from low to high and the diode 57 becomes light emitting resulting in an output signal on the output line 31 of the opto-isolator 56. The signal on line 29 sinks to the ground potential on line 31. This control initiates the motor speed control 23 and the motor 16 can begin to run. The condition of the motor start control 28 remains unchanged until power to the system is interrupted resulting in the resetting of the one-shot 52.

Figure 4:
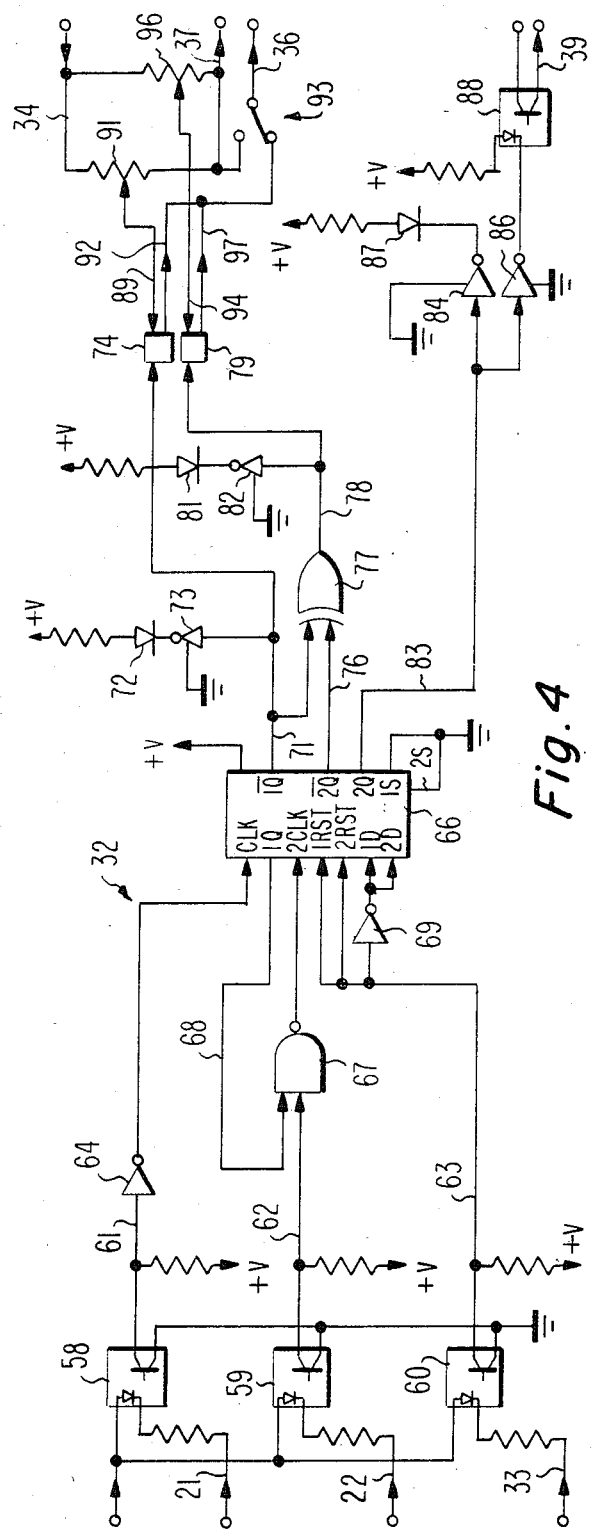
FIG. 4 is a logic diagram of the logic control of FIG. 2.

In FIG. 4, the input lines 21, 22 and 33 are coupled to the LEDs of opto-isolators 58, 59 and 60 respectively. The photosensitive elements of the opto-isolators 58, 59 and 60 are respectively coupled between output lines 61, 62 and 63 and ground. The lines 61, 62 and 63 are biased high. Accordingly, the lines 61, 62 and 63 remain high until the LED's of the opto-isolators 58, 59 and 60 are rendered conductive and emit light. The line 61 is coupled as an input to an inverter 64, the output of which is coupled to a clock input (CLK) of a D-type flipflop 66. The output line 62 is coupled to one input of a NAND gate 67, the output of which is coupled to another clock input (2CLK) of the D-type flipflop 66. The 1Q output of the flipflop 66 is coupled by a line 68 to another input of the NAND gate 67. The output line 63 is directly coupled to the 1 and 2 reset inputs of the flipflop 66 and to the 1D and 2D inputs through an inverter 69.

The 1$\overline{Q}$ output of the flipflop 66 is coupled to an output line 71. A LED 72 is connected to a positive biasing source and to the line 71 through an inverter 73. When the output line 71 is low, the output of the inverter 73 is high and there is no drop across the LED 72 and the LED is off. However, when the output line 71 goes high, the output of inverter 73 goes low and there is a voltage drop across the LED 72 so that the LED is illuminated to indicate that the motor 16 is set to run at high speed. The LED 72 is grounded through the inverter 73. The output line 71 is also coupled as an input to one side of a voltage sensitive switch 74.

The 2$\overline{Q}$ output of the flipflop 66 is available on a line 76. The 1$\overline{Q}$ and 2$\overline{Q}$ outputs of the flipflop 66 available on lines 71 and 76 serve as the inputs to an exclusive OR-gate 77. The output line 78 of the exclusive OR gate 77 is coupled as an input to another voltage sensitive switch 79. A LED 81 is coupled between the output line 78 and a positive biasing source through an inverter 82. The exclusive OR 77 operates such that the output line 78 is low when both the input lines 71 and 76 are the same and the output line 78 is high when the input lines are different. Accordingly, when line 78 is high the output of inverter 82 is low and the LED 81 is illuminated to indicate that motor 16 is running at low speed.

The 2Q output of the flipflop 66 on line 83 is provided as an input to two inverters 84 and 86. The output of the inverter 84 is coupled to a stop LED 87. The output of the inverter 86 is provided as an input to the LED of an opto-isolator 88. Line 83 is normally low so that the outputs of inverters 84 and 86 are high and LED 87 and opto-isolator 88 are off. When line 83 goes high LED 87 illuminates to indicate that motor is stopped and opto-isolator 88 goes on to give an orientation signal to the system.

The voltage sensitive switch 74 has another input line 89 which is coupled to the line 34 from the motor speed control 23 through a high speed adjust potentiometer 91. The output line 92 of the switch 74 is coupled to a run-setup switch 93. The voltage sensitive switch 79 also has another input line 94 which is coupled to the line 34 through a low speed adjust potentiometer 96. The output line 97 of the switch 79 is also coupled to the switch 93. When the switch 93 is in the run position the potentiometer can be used to optimize the running speeds of the motor 16.

Initially, the enable signal on line 33 is off. The opto-isolator 60 is off and line 63 is biased high. The 1 reset and the 2 reset of flipflop 66 are therefore high. With a high signal on the reset inputs, the 1$\overline{Q}$ and 2$\overline{Q}$ outputs are also high. This condition remains as long as the 1 reset and 2 reset inputs are held in the high state, regardless of the conditions of other inputs to flipflop 66. The 1$\overline{Q}$ output of flipflop 66 is an input to inverter 73 and the inverter output is low so that LED 72 is illuminated. The high signal on line 71 from 1$\overline{Q}$ output of flipflop 66 is also supplied to one side of the voltage sensitive switch 74. The high signal on the switch 74 input closes the switch. A DC voltage, typically 0 to 10 volts, is supplied by the motor speed control 23 over line 34. This voltage is chosen by adjusting potentiometer 91. The DC voltage passes through switch 74 to the motor 16 over line 92 and switch 93. The motor 16 is therefore operating at high speed and continues to do so until signals from the sensors 17 and 18 are applied. The motor 16, therefore, runs at high speed before a carrier is engaged with the motor. Accordingly, a carrier rotates at high speed very shortly after engaging the motor 16. This feature greatly reduces the time required to orient the carrier. When a high enable signal is applied to line 33 opto-isolator 60 is switched on and the light sensitive element becomes conductive. Line 63 then goes to ground and the 1 reset and 2 reset inputs of flipflop 66 and the input to inverter 69 go low. The output of inverter 69, and thus the 1D and 2D inputs of flipflop 66 go high. The enable signal line 33 readies the logic control 32 for changes in the motor 16 speed but does not actually change the speed. Speed changes require the sequential reception of signals from the slow down sensor 17 and the stop sensor 18. The reception of a stop signal prior to a slow down signal has no effect because of the NAND gate 67. When a slowdown signal is applied to line 21 opto-isolator 58 becomes conductive and line 61 goes low. The output of inverter 64, therefore, applies a high to the 1 CLK input of flipflop 66. The positive going signal on the 1 CLK input causes information that was located on the 1D input to be transferred to the 1Q output. The 1Q output was previously low and 1$\overline{Q}$ was high. Accordingly, 1Q goes high and 1$\overline{Q}$ goes low. The high 1Q output of flipflop 66 enables the 2 CLK input through the NAND gate 67. The low on the 1$\overline{Q}$ output is applied by line 71 to inverter 73, the output of which goes high to turn off LED 72. The low 1$\overline{Q}$ output is also applied to switch 74 and the switch is turned off to remove the high speed voltage from the motor 16. The low, 1$\overline{Q}$ output of flipflop 66 is applied to exclusive OR gate 77. The high 2$\overline{Q}$ of flipflop 66 is applied to the other input of exclusive OR gate 77. The exclusive OR gate outputs a low signal when the inputs are the same and a high signal when the inputs are different. The inputs are different and therefore the output on line 78 goes high. The high on line 78 illuminates the low speed LED 81 and also energizes voltage sensitive switch 79. The voltage on line 34 is therefore applied to the motor 16 through potentiometer 96, switch 79, line 97 and switch 93. The motor 16 thus runs at slow speed until a stop signal is received.

The input to NAND gate 67 on line 68 turned high when the slow speed signal enabled the 1Q output of flipflop 66. Line 62 is biased high and therefore two high inputs to NAND gate produces a low on the 2 CLK input of flipflop 66. When a stop signal is applied to line 22 59 becomes conductive and line 62 goes low causing NAND gate 67 to place a high on the 2 CLK input of flipflop 66. The 2$\overline{Q}$ goes low and line 76 to exclusive OR gate 77 also goes low. Both inputs to exclusive OR gate 77 are low and output line 78 goes low to turn off LED 81 and switch 79. Both switches 74 and 79 are open and the motor 16 receives no running voltage. The regenerative breaking promptly stops the motor and the carrier 11 is accurately oriented.

When the 2 CLK input of flipflop 66 was switched high by NAND gate 67 the 2Q output on line 83 went high. The outputs of inverts 84 and 86 went low to illuminate stop LED 87 and energize opto-isolator 88. The output of opto-isolator 88 on line 39 tells the system that the orientation process has been completed. The logic remains in this state until the enable signal is removed.

When the enable signal is removed from line 33 opto-isolator 60 is turned off and line 63 goes high rendering 1 and 2 reset inputs of flipflop 66 high. The 1$\overline{Q}$ and 2$\overline{Q}$ outputs return to the normal high state and 1Q and 2Q outputs return to the low state. The high on line 71 from the 1$\overline{Q}$ output turns on high speed LED 72 and switch 74. The motor 16 runs at high speed awaiting another enable signal indicating that a carrier is to be orientated. Both inputs to exclusive OR gate 77 are high so the output is low and LED 81 and switch 79 are off. Also, the low 1Q reset NAND gate 67 while the low 2Q turned off LED 87 and opto-isolator 88. The entire system therefore is ready for the next carrier.

What is claimed is:

1. A system for accurately orienting a member rotated by a motor in a desired orientation, said motor being responsive to a motor speed control means whereby said motor is controlled by said system through said motor speed control means, said system comprising:

a slow down sensor and a stop sensor located in spaced relation to said member, actuating means arranged on said rotated member for passing in close proximity to said sensors whereby said slow down sensor and said stop sensor sequentially provide slow down and stop signals to a logic control means, said logic control means actuating said motor speed control means in response to said slow down and said stop signals whereby said motor is responsive to said slow down and said sensors; and motor start control means responsive to said motor speed control means for delaying rotation of said motor for a predetermined time after said system is voltage actuated.

2. The system of claim 1 wherein said logic control means includes bistable logic means having separate input terminals individually responsive to said slow down signal and to said stop signal, and said bistable logic means has separate output terminals;

said system also including voltage responsive speed control switches individually responsive to said output terminals whereby said motor changes speed in response to said slow down signal and stops in response to said stop signal.

3. The system of claim 2 wherein said bistable logic means is at least one D type flip flop.

4. The system of claim 3 further including an exclusive OR gate arranged between said output terminals and one of said switches.

5. The system of claim 4 wherein said motor start control means includes monostable logic means, and time delay means for delaying the output of said monostable logic means for a predetermined period of time.

6. The system of claim 5 wherein said monostable logic means is a one-shot.

7. The system of claim 1 further including logic means arranged between said stop sensor and said logic control means for preventing said motor from responding to a stop signal prior to the reception of a slow down signal.

8. The system of claim 7 wherein said logic means is a NAND gate.

9. The system of claim 2 further including logic means arranged between said stop sensor and said logic control means for preventing said motor from responding to a stop signal prior to the reception of a slow down signal.

10. The system of claim 9 wherein said logic means is a NAND gate.

* * * * *